G. KEYSER.
SEWING MACHINE.
APPLICATION FILED JULY 16, 1909.

1,069,336.

Patented Aug. 5, 1913.
5 SHEETS—SHEET 5.

WITNESSES
*Ab Gamble*
*P. Schleicher*

INVENTOR
*George Keyser*
BY *A. V. Groupe*
ATTORNEY

UNITED STATES PATENT OFFICE.

GEORGE KEYSER, OF PHILADELPHIA, PENNSYLVANIA, ASSIGNOR OF ONE-HALF TO JOHN W. HEPWORTH, OF PHILADELPHIA, PENNSYLVANIA.

SEWING-MACHINE.

1,069,336.  Specification of Letters Patent.  Patented Aug. 5, 1913.

Application filed July 16, 1909. Serial No. 507,887.

*To all whom it may concern:*

Be it known that I, GEORGE KEYSER, citizen of the United States, residing at Philadelphia, in the county of Philadelphia and State of Pennsylvania, have invented certain new and useful Improvements in Sewing-Machines, of which the following is a specification.

This invention relates to that class of sewing machines wherein a means for supporting and advancing the edges of the fabric to be united is employed in combination with a sewing mechanism including a needle and a looper which are actuated to effect the sewing operation.

The object of my invention is to provide in a machine of the class to which my invention relates, a novel, simple and efficient construction and organization of needle and looper mechanism for effecting the sewing operation.

The invention also includes various novel features of construction and organizations of parts all as will be hereinafter fully described and particularly pointed out in the claims.

The main frame of the machine comprises the bed plate 4 and the overhanging arm 8 rising therefrom. Journaled in a bearing 10 in the arm 8 and in a bearing 11 on the bed plate 4 is the main shaft 12 which is provided with a suitable driving pulley 13. Secured to the outer end of the arm 8 is a downwardly-extending shaft 14 which supports a circular head 15 below the arm 8.

The head 15 is secured to the shaft 14 by means of a set screw 16 extending through the hub 17 of the head 15 and into a slot 18 in the shaft 14, the engagement of the screw 16 with the slot 18 serving to prevent accidental rotation of the head 15 upon the shaft 14. The lower end of the shaft 14 is reduced and screw-threaded as at 19 for the reception of a head 20 which is screwed on to the reduced portion 19 and supports the hub 17 of the head 15. By loosening the set screw 16 and turning the head 20, the head 15 may be adjusted vertically upon the shaft 14.

Surrounding the head 15 and rotatably fitted to the periphery thereof is an annulus 21 which is supported by a ring 22 secured to the bottom of the head 15. The annulus 21 carries a circular series of radially projecting impaling pins 23 upon which the edges of the fabric to be united are impaled, and by which the fabric is supported and advanced to the sewing mechanism including the needle 24 and looper 25 which will be hereinafter described.

The annulus 21 is in the form of an internal gear wheel provided with teeth 26 which coact with the teeth of a pinion 27 arranged within an opening in one side of the head 15. The pinion 27 is secured to a vertical shaft 28 which extends through and is journaled in a block 29 fixed to the head 15.

Secured to the upper end of the shaft 28 is a ratchet wheel 30, and interposed between the ratchet wheel 30 and the top of the block 29 is a disk 31 which is rotatably mounted on the shaft 28 and is provided with an upwardly projecting flange or guard 32 which embraces the ratchet wheel 30. Pivoted to the disk 31 is a pawl 33 which, when the disk 31 is rocked back and forth about the axis of the shaft 28 will engage the ratchet wheel 30 and rotate it and therewith the shaft 28 carrying the pinion 27 step by step, thereby causing the pinion 27 to rotate the annulus 21 step by step around the head 15. The pawl 33 is drawn normally into engagement with the ratchet wheel 30 by the action of a spring 34, one end of which is attached to a pin 35 projecting upwardly from the pawl 33 and the other end of which is attached to a pin 36 projecting upwardly from a stop pawl 37 which is pivoted as at 38 to the block 29. The pawl 37 is drawn normally into engagement with the ratchet wheel 30 by the action of the spring 34 in a manner to prevent backward movement of the ratchet wheel. The pawl 37 is provided with a projecting arm 39 by means of which the pawl may be moved out of engagement with the ratchet wheel 30; and the arm 39 is arranged to engage the pin 35 of the pawl 33 and move it out of engagement with the ratchet wheel 30 while moving the pawl 37. When the pawls 33 and 37 are thus moved out of engagement with the ratchet wheel 30, the shaft 28 may be turned by hand in either direction to rotate the annulus 21 about the head 15 in either direction; and for this purpose I provide the lower projecting end of the shaft 28 with a suitable handle or crank 40 by means of which the shaft may be turned.

During the operation of the machine, the disk 31 is rocked back and forth about the axis of the shaft 28 to advance the annulus 21 by an eccentric 41 on the main driving shaft 12. The eccentric 41 is provided with an eccentric strap 42 which is connected to one end of a rod 43 the other end of which is pivotally connected, as at 44, to the disk 31 to effect the back-and-forth rocking thereof during the rotation of the main shaft 12.

The needle 24 is carried by an arm 50 which projects fixedly from a shaft 51 which is mounted to be rocked in a fixed bracket 52. This bracket 52 is provided with a projecting sleeve 53 extending into a boss 54 on the bottom of the arm 8. The sleeve 53 and therewith the bracket 52 is held rigid with the arm 8 by means of a set screw 55 screwed into the arm 8 and engaging the sleeve 53. The shaft 51 is located above the path of the impaling pins 23 and the needle is made curved as shown.

The shaft 51 and needle 24 are so located with respect to the impaling pins 23 and the fabric F carried by the pins, that when the shaft 51 is rocked back and forth the needle 24 will be advanced and retracted in a manner to pass over the impaling pins 23 and penetrate the edges of the fabric F and be withdrawn therefrom. The rocking of the shaft 51 is effected during the operation of the machine by an eccentric 56 on the driving shaft 12. The eccentric 56 is provided with an eccentric strap 57 provided with an arm 58 which is pivoted as at 59 to an arm 60 projecting fixedly from the shaft 51.

The arm 58 comprises a central portion 61, an end portion 62 formed integral with the strap 57, and an end portion 63 connected to the arm 60. The central portion 61 is provided with screw-threaded ends which are screwed into the end portions 62 and 63, whereby, when the central portion 61 is turned the arm 58 may be lengthened or shortened to adjust the needle 24 with respect to the eccentric 56. Suitable jam nuts 64 and 65 are provided on the central portion 61 and are adapted to engage the end portions 62 and 63 respectively, to lock the central portion 61 in its positions of adjustment.

The timing of the operation of the needle 24 with respect to the step-by-step forward movement of the head 15 and impaling pin 23 is such that each time the head 15 comes to rest an impaling pin 23 will be directly beneath the needle 24, and each time an impaling pin 23 is at rest, below the needle 24 the needle will be advanced and retracted over the underlying pin and through the edges of the fabric F, during the sewing operation which will be hereinafter described.

The looper 25 is made curved as shown, and it is carried by an arm 66 on the lower end of a vertical shaft 67 which is mounted to be rocked in a sleeve 68 extending through a split boss 69 on the bracket 52. A screw 70 is provided and engaged with the boss 69 in a manner to draw the two sides thereof toward each other to clamp the sleeve 68 therein. The looper 25 is positioned to move over the edges of the fabric F from side to side thereof and to coöperate with the needle 24 to effect the sewing operation when the shaft 67 is rocked back and forth as will be hereinafter described.

The shaft 67 is rocked back and forth during the operation of the machine by an eccentric 71 on the driving shaft 12, and this eccentric 71 is connected to the shaft 67 as follows: The upper end of the shaft 67 is provided with a projecting arm 72 having an outer split end the sides of which are drawn toward each other by a screw 73. Screwed into the outer split portion of the arm 72 is the lower end of an upwardly-extending, screw-threaded post 74 the upper end of which is provided with a ball 75. The ball 75 is fitted to a socket in an arm 76 extending from an eccentric strap 77 which surrounds the eccentric 71. The outer face of the eccentric 71 is made convex and is fitted to an inner concave surface of the strap 77 to permit the arm 76 to be rocked laterally and to permit the post 74 to describe an arc at right angles to the plane of rotation of the eccentric 71 and thus permit the back and forth rocking of the shaft 67 which is arranged at right angles to the shaft 12 carrying the eccentric 71. The eccentric strap 77 is retained in place upon the eccentric 71 by a ball 72 arranged in adjacent grooves 79 and 80 cut in the engaging faces of the eccentric 71 and strap 77 respectively. The ball 78 is maintained in place on a line extending at right angles to the axis of the arm 76 from the center of the eccentric 71 by its engagement with a spring 81 arranged within a depression in the eccentric strap 77.

The arm 76 comprises a central portion 82, an end portion 83 formed integral with the strap 77, and an end portion 84 mounted upon and fitted to the ball 75 of the post 74. The central portion 82 is provided with screw-threaded ends which are screwed into the end portions 83 and 84 whereby, when the central portion 82 is turned, the arm 76 may be lengthened or shortened to adjust the looper 25 with respect to the eccentric 71 and the needle 24. Suitable jam nuts 85 and 86 are provided on the central portion 76 and are adapted to engage the end portions 83 and 84 respectively to lock the central portion 82 in its positions of adjustment.

The looper 25 may be adjusted vertically with respect to the impaling pins 23 and the needle 25 by loosening the screw 70 and raising or lowering the sleeve 68, and then tightening the screw 70 to hold the sleeve in its position of adjustment.

The needle thread 87 passes from a suitable source of supply to and through a pair of spring pressed tension disks 88 carried by a shaft 89 on the bracket 52. From the tension disks 88 the thread 87 passes down through a slot 90 in a rod 91 projecting horizontally from the bracket 52, and from the slot 90 the thread 87 passes to and through an eye 92 on the needle arm 50. From the eye 92 the thread 87 passes through a groove 93 in the bottom of the needle 24 to and through a thread delivery eye 94 in the needle near the point thereof, and from the eye 94 to the stitches being formed during the sewing operation. The thread 87 in passing through the slot 90 is engaged by a take-up collar 95 which is slidingly fitted to the rod 91 and is pressed into engagement with the thread 87 by a spring 96 encircling the rod 91. It will thus be seen that the take-up collar 95 working back and forth upon the rod 91 by and against the action of the spring 96, will take up the slack thread 87 occurring between the needle eye 94 and tension disks 88 during the operation of the needle 24.

The looper thread 97 passes from a suitable source of supply to and through a pair of spring-pressed tension disks 98 carried by the shaft 89 on the bracket 52. From the tension disks 98, the thread 97 passes down through a slot 99 in a rod 100 projecting horizontally from the bracket 52 adjacent the rod 91, and from the slot 99 the thread 97 passes to and through eyes 101 and 102 on the looper arm 66. From the eye 102 the thread 97 passes through a groove 103 in the outer face of the looper 25 to and through a thread delivery eye 104 in the looper near the point thereof, and from the eye 104 to the stitches being formed during the sewing operation. The thread 97 in passing through the slot 99 is engaged by a take-up collar 105 which is slidingly fitted to the rod 100 and is pressed into engagement with the thread 97 by a spring 106 encircling the rod 100. It will thus be seen that the take-up collar 105 working back and forth upon the rod 100 by and against the action of the spring 106, will take up the slack thread 97 occurring between the looper eye 104 and the tension disks 98 during the operation of the needle.

The tension and take-up devices for the needle thread and for the looper thread are substantially identical in form, and they are arranged side by side on the bracket 52.

During the operation of the machine, the fabric F is maintained against the outer face of the annulus 21 adjacent the sewing mechanism by the usual guard 107 arranged below the path of the impaling pins and between which and the outer face of the annulus 21 the fabric is advanced. This guard 107 is secured to and is supported by a rod 108 extending downwardly from the arm 8.

In order to form a chain of stitches by the sewing mechanism when no fabric is being sewed, so that the sewing mechanism will start to sew immediately upon the presentation of the fabric to the needle and looper, and also to form an elastic stitch during the sewing operation, all as will be fully described hereinafter, I provide a stitch-receiving finger 109 projecting from the horizontal portion of a bent plate 110, the vertical portion of which rests against the outer face of the guard 107 and is provided with a slot 111 therein. The plate 110 is secured to the guard 107 in a manner to be vertically adjustable thereon by a suitable screw 112 extending through the slot 111 in the plate and screwed into the guard 107.

By loosening the screw 112 the plate 110 and therewith the stitch-receiving finger 109 may be adjusted vertically with respect to the impaling pins 23. The stitch-receiving finger 109 is arranged directly over and parallel to the path of the upper edges of the fabric F to be united, and the finger 109 projects from the plate 110 on the fabric-receiving side of the needle 24 to a position above and a slight distance beyond the needle, whereby, during the sewing operation hereinafter described, stitches may be formed around the finger 109 and discharged from the free end thereof as the stitches are successively formed with or without the presence of the fabric at the sewing point.

Figure 1:
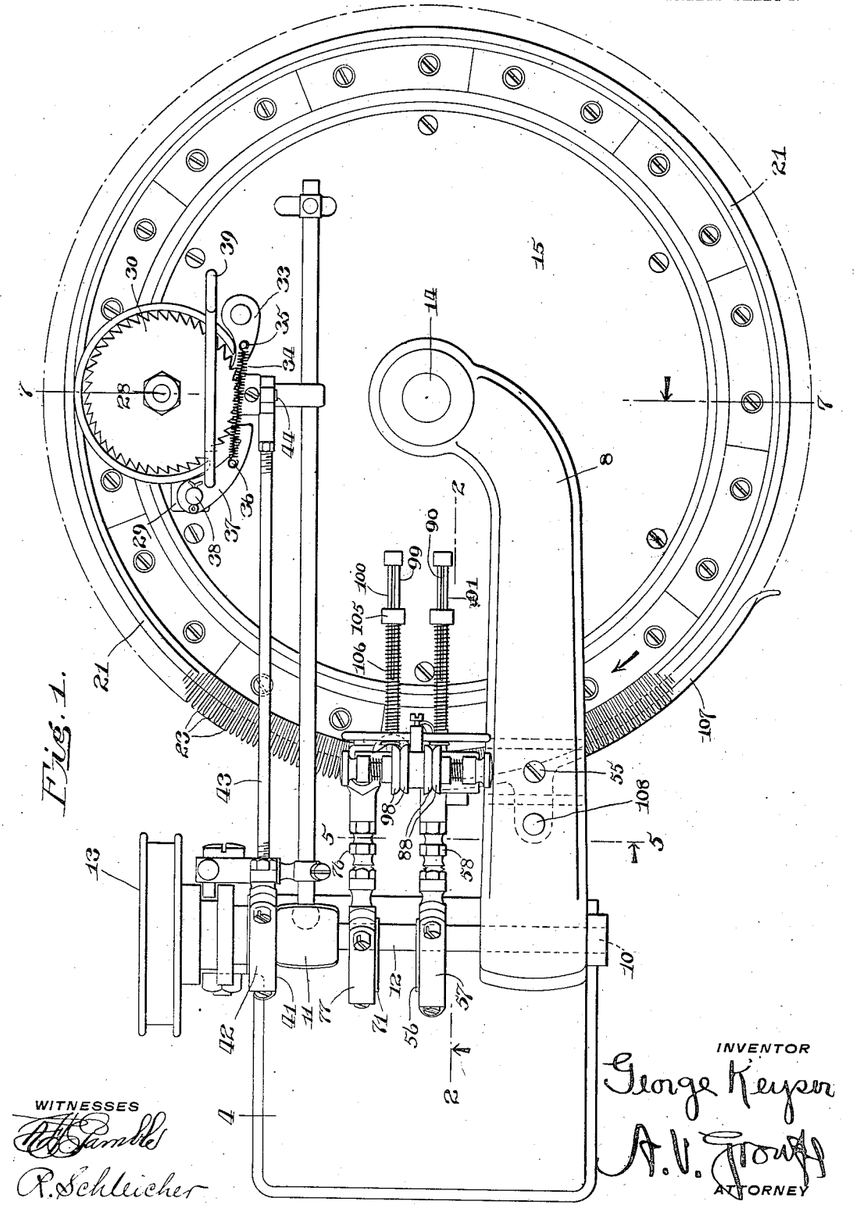
—Figure 1 is a plan view of my improved sewing machine.
Figure 2:
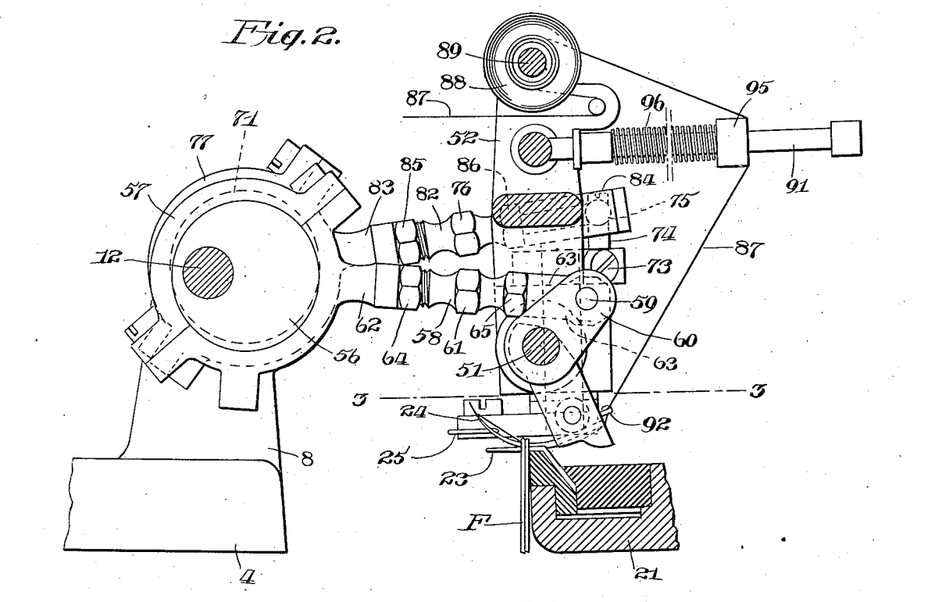
Fig. 2 is a vertical section on line 2—2 of Fig. 1, showing the needle and looper actuating eccentrics in the forward position.
Figure 3:
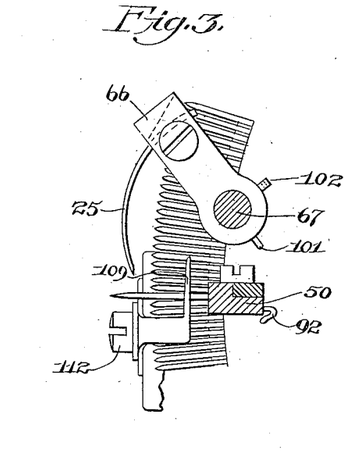
Fig. 3 is a horizontal section on line 3—3 of Fig. 2.

The operation of the machine is as follows:—When power is applied to the driving shaft 12 the annulus 21 with its impaling pins 23 carrying the edges of the fabric F to be united, is advanced in the direction indicated by the arrow in Fig. 1, under the influence of eccentric 41; and the needle 24 and looper 25 are operated under the influence of the eccentrics 56 and 71 respectively through the connections hereinbefore described. Each time the main driving shaft makes one complete revolution, the annulus 21 is advanced a distance equal to the distance between two adjacent impaling pins 23, the annulus remaining at rest with an impaling pin directly beneath the needle 24 during one half of the revolution of the shaft 12; and each time the shaft 12 makes a complete revolution, the needle 24 is advanced about the axis of the shaft 51 from the position shown in Figs. 4 and 12 to and through the edges of the fabric F and over the underlying impaling pin 23 to the position shown in Figs. 2 and 10 and is retracted therefrom to the position shown in Figs. 4 and 12; and each time the shaft 12 makes a complete revolution the looper 25 is retracted about the axis of the shaft 67 from the position shown in Figs. 4 to 12 to the position shown in Figs. 2, 3 and 10; and then advanced to the position shown in Figs. 4 and 12. The needle 24 and looper 25 are so positioned and operated with respect to each other that the eye of the needle describes an arc from a fixed center or the axis of the shaft 51 and the eye of the looper describes an arc from a fixed center or the axis of the shaft 67; the eye of the needle moving through the fabric and to positions above the fabric and the stitch receiving finger 109 on each side of the line of sewing or on each side of the fabric F; and the eye of the looper 25 and the part thereof which receives the needle thread from the needle moving through a path below the high positions reached by the needle eye and above the fabric F and finger 109; the looper eye, during its movement crossing the path of the needle eye on each side of the fabric or line of sewing during the sewing operation which I shall now describe.

Figure 4:
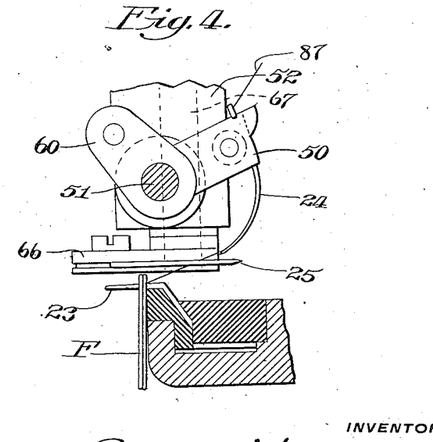
Fig. 4 is a view in vertical section of parts shown in Fig. 2, showing the looper in the forward position and the needle in the retracted position.
Figure 5:
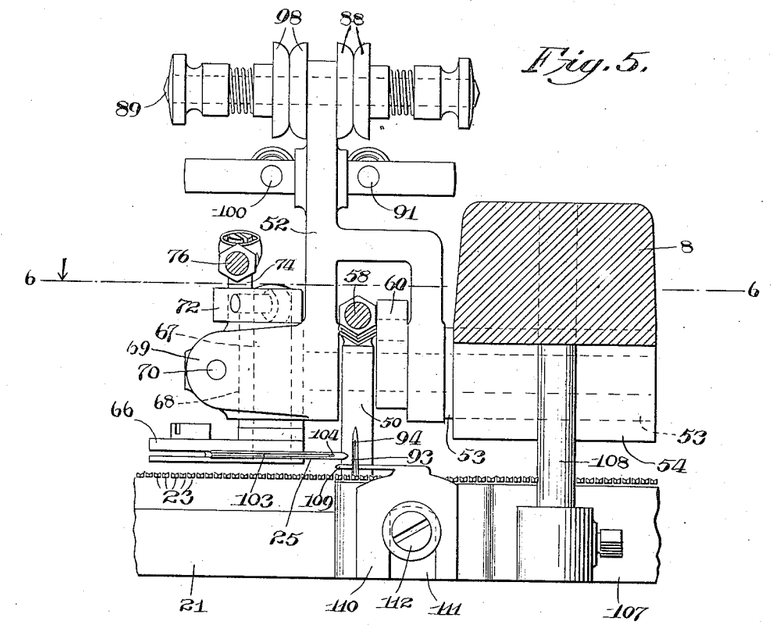
Fig. 5 is a vertical section on line 5—5 of Fig. 1.
Figure 6:
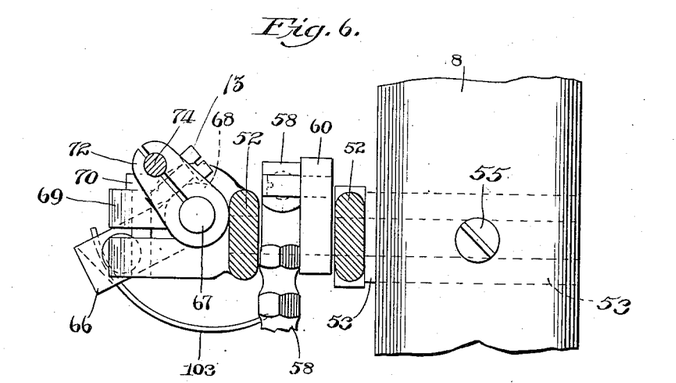
Fig. 6 is a horizontal section on line 6—6 of Fig. 5.
Figure 7:
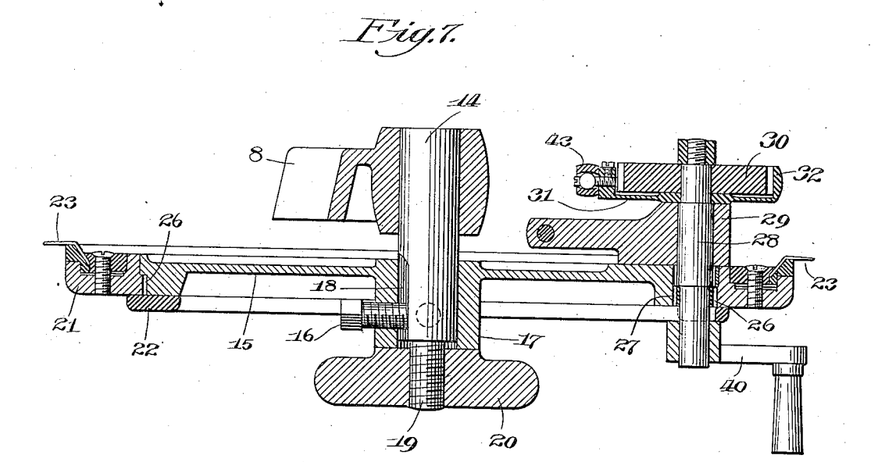
Fig. 7 is a vertical section on line 7—7 of Fig. 1.
Figure 8:
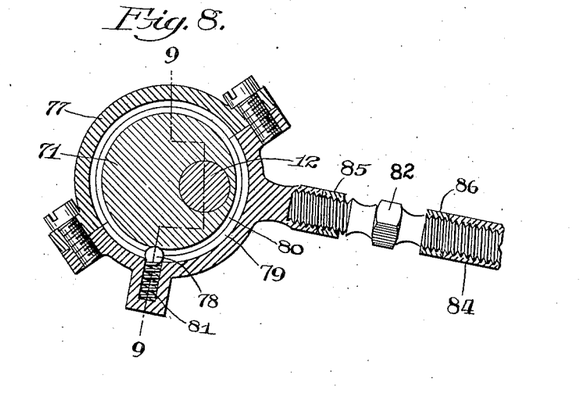
Fig. 8 is a longitudinal, vertical section through the eccentric for operating the looper, and adjuncts.
Figure 9:
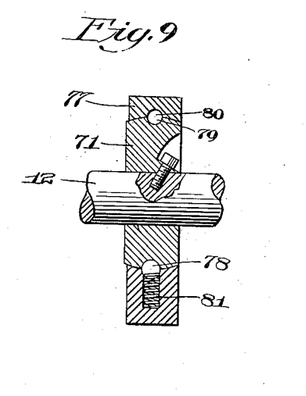
Fig. 9 is a vertical section on line 9—9 of Fig. 8.
Figure 12:
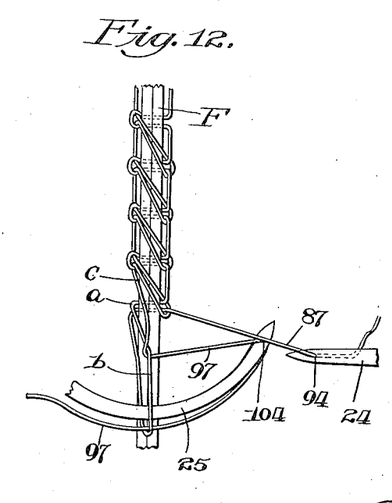

Starting with the needle 24 in the retracted position, and the looper 25 in the forward position as shown in Figs. 4 and 12, the needle thread extends from a previously formed stitch, as at $a$, first to form a loop $b$ on one side of the fabric F and extending around the body of the looper 25 and thence through the fabric F to the needle eye 94 on the other side thereof, and thence to the tension and take-up devices; while the looper thread 97 extends from a previously formed stitch, as at $c$, through the loop $b$ of needle thread to and through the eye 104 of the looper 25 and then back and through the loop of needle thread $b$ to the tension and take-up devices.

It will be observed that the looper thread 97 extends from the looper eye 104 to the loop $b$ in spaced relation to the body of the looper 25, due to the curvature of the looper, and that the point of the needle 24 is in position to be advanced downwardly between the looper thread 97 and the body of the looper.

Figure 10:
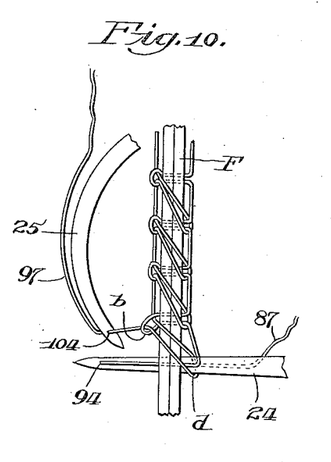
Figs. 10 to 13 inclusive are diagrammatic views showing the formation of a stitch by the needle and looper during the sewing operation.
Figure 13:
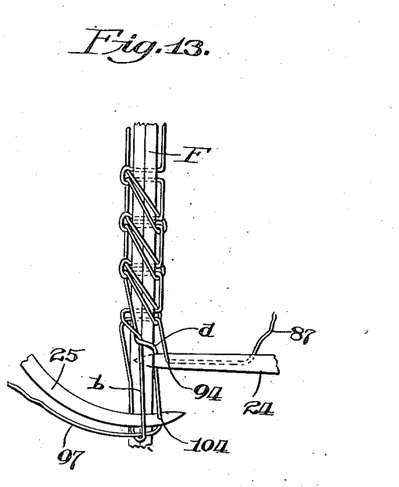

During the initial forward and downward movement of the needle 24 in moving from the position shown in Fig. 12 first to the position shown in Fig. 13 and then to the position shown in Fig. 10, the needle passes between the body of the looper 25 and the looper thread 97 extending from the loop $b$ to the looper eye 104, and receives a loop $d$ of looper thread; and as the needle completes its forward movement, the needle and its thread 87 are projected through the loop $d$ and the fabric F, and the eye 94 of the needle is brought to a position beyond and above the point of the looper 25 as shown in Fig. 10.

Figure 11:
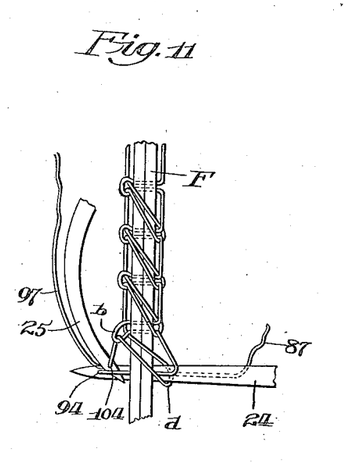

As the needle 24 is being advanced from the position shown in Fig. 12 to the position shown in Fig. 10, the looper 25 is being retracted from the position shown in Fig. 12, first to the position shown in Fig. 13 and then to the position shown in Fig. 10, and during the retraction of the looper 25 it casts off the loop $b$ and draws the loop $d$ around the needle 24 on one side of the fabric F while the needle 24 draws up the loop $b$ around the loop $d$ on the other side of the fabric. The looper 25 as shown in Fig. 10 is now in position to be advanced between the body of the needle 24 and the needle thread 87 extending from the needle eye 94 to the fabric F. As the looper 25 is advanced from the position shown in Fig. 10 first to the position shown in Fig. 11 and then to the position shown in Fig. 12, the point of the looper 25 passes between the body of the needle 24 and the needle thread 87, as shown in Fig. 11, and the looper 25 thus takes from the needle 24 a loop of needle thread corresponding with the loop $b$ previously cast off by the looper 25, and at the same time draws the looper thread 97 through the loop of needle thread $b$ to the position shown in Fig. 12, to be again engaged by the needle 24 when it is advanced to take another loop $d$ of looper thread.

While the looper 25 is being advanced from its retracted position shown in Fig. 10 to its forward position shown in Fig. 12, the needle 24 is being retracted from its forward position shown in Fig. 10 to its retracted position shown in Fig. 12, leaving its thread 87 extending through the fabric F and forming a loop $b$ extending around the body of the looper 25, and the parts are in position for a succeeding operation. Thus the stitches are successively formed, the looper taking a loop of needle thread on one side of the fabric F, and the needle taking a loop of the looper thread on the other side of the fabric F, the loop of looper thread extending over the edges of the fabric F and engaging the loop of needle thread on one side of the fabric, and the loop of needle thread extending through the fabric and engaging the loop of looper thread on the other side thereof.

During the sewing operation, the stitches are not only formed around the edges of the fabric F being united, but they are also formed around the stitch receiving finger 109 which is located directly over the edges of the fabric F and beneath the path of movement of the looper 25; and as rapidly as the stitches are formed, and the fabric F is advanced by the annulus 21, the stitches are discharged from the free end of the finger 109. It will thus be seen that when no fabric is present at the point of sewing in the machine, the stitches will be formed around the stitch-receiving finger 109, thus preventing the interruption of the sewing operation due to the absence of the fabric.

The stitch-receiving finger 109 not only serves to prevent the interruption of the sewing operation when no fabric is present, but it also serves to regulate the quantity of thread permitted to remain in the stitches during the sewing of fabric. It will be readily understood that by loosening the screw 112 and raising the finger 109 with respect to the top of the fabric F, the quantity of thread permitted to remain in the stitches during the sewing operation will be increased; and by lowering the finger 109 the quantity of thread may be decreased. Thus stitches of any desired elasticity may be formed.

It will be observed that during the sewing operation the looper 25 moves through a path entirely above the edges of the fabric, or, in other words, a path entirely outside of a plane extending at right angles to the fabric from the edges thereof, and that the looper 25 does not move below the top of the edges of the fabric on each side thereof in order to permit the looper 25 to take the needle thread and the needle 24 to take the looper thread, as is common in machines of the class to which my invention relates. This is an important feature of my invention.

My invention is herein shown in a desirable and practicable form, but I desire it to be understood that many changes may be made without departing from my invention.

I claim:—

1. In a sewing machine, the combination of the frame thereof, means for supporting and advancing the fabric to be sewed, a curved needle provided with a thread-delivery eye, means for supporting and actuating the needle, a looper support, a looper secured to said support and provided with a thread-delivery eye, and means for actuating the looper support and its looper in conjunction with the needle to produce stitches, the thread-engaging part of the looper during the actuation thereof moving from side to side of the line of sewing and traversing a path in a single plane and intersecting the plane of the path of the needle, the eye of the needle moving to a position above the plane of the looper at the outward end of the needle stroke, and the looper intersecting the plane of movement of the needle at opposite sides of the line of sewing.

2. In a sewing machine, the combination of the frame thereof, means for supporting and advancing the fabric to be sewed, a needle provided with a thread-delivery eye, means for supporting and actuating the needle, a looper provided with a thread-delivery eye, and means for supporting and actuating the looper in conjunction with the needle to produce stitches, the eye of the needle during the actuation thereof describing an arc, the thread-engaging part of the looper during the actuation thereof moving from side to side of the line of sewing and describing an arc in a single plane, the plane of one arc being at an angle with respect to the plane of the other arc, the eye of the needle moving to a position above the plane of the looper at the outward end of the needle stroke, and the looper intersecting the plane of movement of the needle at opposite sides of the line of sewing.

3. In a sewing machine, the combination of the frame thereof, means for supporting and advancing the fabric to be sewed, a curved needle provided with a thread-delivery eye, means for supporting and reciprocating the needle, a curved looper provided with a thread-delivery eye, and means for supporting and reciprocating the looper in conjunction with the needle to produce stitches, the eye of the needle during the reverse movement thereof substantially following the space occupied by the body of the needle in the forward position thereof, the eye of the looper moving from side to side of the line of sewing and during the reverse movement thereof substantially following the space occupied by the body of the looper in the forward position thereof, the eye of the needle moving to a position above the plane of the looper at the outward end of the needle stroke, and the looper intersecting the plane of movement of the needle at opposite sides of the line of sewing.

4. In a sewing machine, the combination of the frame thereof, means for supporting and advancing the fabric to be sewed, a needle arm movable about a fixed axis, a curved needle secured to the needle arm, means for actuating the needle arm, a looper arm movable about a fixed axis and prevented from having movement longitudinally of the axis, the axis about which the needle arm moves being at an angle with respect to the axis about which the looper arm moves, a looper secured to the looper arm, and means for actuating the looper arm and moving the thread-engaging part of the looper from side to side of the edges of the fabric, the eye of the needle moving to a position above the plane of the looper at the outward end of the needle stroke, and the looper intersecting the plane of movement of the needle at opposite sides of the line of sewing.

5. In a sewing machine, the combination of the frame thereof, means for supporting and advancing the fabric to be sewed, a needle arm movable about a fixed axis, a curved needle provided with a thread-delivery eye and secured to the needle arm, means for reciprocating the needle arm, a looper arm movable about a fixed axis and prevented from having movement longitudinally of the axis, the axis about which the needle arm moves being at an angle with respect to the axis about which the looper arm moves, a curved looper provided with a thread-delivery eye and secured to the looper arm, and means for actuating the looper arm, the eye of the needle during the reverse movement thereof substantially following the space occupied by the body of the needle in the forward position thereof, and the eye of the looper moving from side to side of the edges of the fabric during the reverse movement thereof substantially following the space occupied by the body of the looper in the forward position thereof, the eye of the needle moving to a position above the plane of the looper at the outward end of the needle stroke and the looper intersecting the plane of movement of the needle at opposite sides of the line of sewing.

6. In a sewing machine, the combination of the frame thereof, means for supporting and advancing the fabric to be sewed, a driving shaft, a needle arm movable about a fixed axis, a curved needle secured to the needle arm, an eccentric on said shaft operatively connected to the needle arm, a looper arm movable about a fixed axis and prevented from having movement longitudinally of the axis, the axis about which the needle arm moves being at an angle with respect to the axis about which the looper arm moves, a looper secured to the looper arm, and an eccentric on said shaft operatively connected to the looper arm, the point of the needle during the actuation thereof moving to a position above the path of the looper and to a position below the path of the looper and the looper intersecting the plane of movement of the needle at opposite sides of the line of sewing.

7. In a sewing machine, the combination of the frame thereof, means for supporting and advancing the fabric to be sewed, a driving shaft, a needle arm movable about a fixed axis, a curved needle provided with a thread-delivery eye and secured to the needle arm, an eccentric on said shaft operatively connected to the needle arm and arranged to reciprocate the same, a looper arm movable about a fixed axis and prevented from having movement longitudinally of the axis, the axis about which the needle arm moves being at an angle with respect to the axis about which the looper arm moves, a curved looper provided with a thread-delivery eye and secured to the looper arm, and an eccentric on said shaft operatively connected to the looper arm and arranged to reciprocate the same, the eye of the needle during the reverse movement thereof substantially following the space occupied by the body of the needle in the forward position thereof, the eye of the needle moving to a position above the plane of the looper at the outward end of the needle stroke, the eye of the looper during the reverse movement thereof substantially following the space occupied by the body of the looper in the forward position thereof and the looper intersecting the plane of movement of the needle at opposite sides of the line of sewing.

8. In a sewing machine, the combination of the frame thereof, means for supporting and advancing the fabric to be sewed, a driving shaft, a needle arm movable about a fixed axis, a curved needle secured to the needle arm, an eccentric on said shaft operatively connected to the needle arm, a looper arm movable about a fixed axis and prevented from having movement longitudinally of the axis, the axis about which the needle arm moves being at an angle with respect to the axis about which the looper arm moves, a looper secured to the looper arm, an eccentric on the driving shaft, an eccentric strap surrounding the last named eccentric and having a rocking motion thereon, and an arm extending from said strap and connected to the looper arm, the point of the needle during the actuation thereof moving to a position above the path of the looper and to a position below the path of the looper.

9. In a sewing machine, the combination of the frame thereof, means for supporting and advancing the fabric to be sewed, a driving shaft, a needle arm movable about a fixed axis, a curved needle provided with a thread-delivery eye and secured to the needle arm, an eccentric on said shaft operatively connected to the needle arm and arranged to reciprocate the same, a looper arm movable about a fixed axis and prevented from having movement longitudinally of the axis, the axis about which the needle arm moves being at an angle with respect to the axis about which the looper arm moves, a curved looper provided with a thread-delivery eye and secured to the looper arm, an eccentric on the driving shaft, an eccentric strap surrounding the last named eccentric and having a rocking motion thereon, and an arm extending from said strap and connected to the looper arm, the eye of the needle during the reverse movement thereof substantially following the space occupied by the body of the needle in the forward position thereof, and the eye of the looper during the reverse movement thereof substantially following the space occupied by the body of the looper in the forward position thereof.

10. In a sewing machine, the combination of the frame thereof, means for supporting and advancing the fabric to be sewed, a driving shaft, a needle arm movable about a fixed axis, a curved needle secured to the needle arm, an eccentric on said shaft operatively connected to the needle arm, a looper arm movable about a fixed axis and prevented from having movement longitudinally of the axis, the axis about which the needle arm moves being at an angle with respect to the axis about which the looper arm moves, a looper secured to the looper arm, an eccentric on the driving shaft, an eccentric strap surrounding the last named eccentric and having a rocking motion thereon, and an arm extending from said strap and connected to the looper arm by a ball-and-socket joint, the point of the needle during the actuation thereof moving to a position above the path of the looper and to a position below the path of the looper.

In testimony whereof I affix my signature in presence of two witnesses.

GEORGE KEYSER.

Witnesses:
S. I. HARPER,
E. M. WARE.